(12) United States Patent
Haefli

(10) Patent No.: US 12,211,192 B2
(45) Date of Patent: *Jan. 28, 2025

(54) SYSTEM AND METHOD FOR ANALYZING AN INTEGRITY OF A ROOF COVERING

(71) Applicant: STATE FARM MUTUAL AUTOMOBILE INSURANCE COMPANY, Bloomington, IL (US)

(72) Inventor: Eric Haefli, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,194

(22) Filed: Aug. 17, 2023

(65) Prior Publication Data

US 2023/0394640 A1   Dec. 7, 2023

Related U.S. Application Data

(63) Continuation of application No. 17/699,723, filed on Mar. 21, 2022, now Pat. No. 11,776,100, which is a continuation of application No. 16/996,890, filed on Aug. 18, 2020, now Pat. No. 11,308,600, which is a continuation of application No. 16/278,897, filed on Feb. 19, 2019, now Pat. No. 10,825,161.

(51) Int. Cl.
| | |
|---|---|
| *G01N 3/12* | (2006.01) |
| *E04D 1/12* | (2006.01) |
| *G06Q 40/08* | (2012.01) |
| *G06T 7/00* | (2017.01) |

(52) U.S. Cl.
CPC ............. *G06T 7/0002* (2013.01); *E04D 1/12* (2013.01); *G01N 3/12* (2013.01); *G06Q 40/08* (2013.01)

(58) Field of Classification Search
CPC ......... G06T 7/0002; G06T 2207/30132; G06T 2207/30184; G06T 7/001; E04D 1/12; G01N 3/12; G06Q 40/08
USPC ....................................................... 382/100
See application file for complete search history.

(56) References Cited

U.S. PATENT DOCUMENTS

| | | | |
|---|---|---|---|
| 9,283,681 B2 | 3/2016 | Slawinski et al. | |
| 10,176,526 B2 * | 1/2019 | McLaughlin | G06Q 40/08 |
| 10,311,302 B2 | 6/2019 | Kottenstette et al. | |
| 10,366,288 B1 | 7/2019 | Kottenstette et al. | |
| 10,462,429 B1 * | 10/2019 | Hillman | G06Q 40/08 |
| 10,643,072 B2 | 5/2020 | Kottenstette et al. | |
| 11,151,378 B2 | 10/2021 | Kottenstette et al. | |
| 11,210,552 B2 | 12/2021 | Kossyk et al. | |

(Continued)

OTHER PUBLICATIONS

Office Action for U.S. Appl. No. 16/996,890, dated Sep. 24, 2021.

*Primary Examiner* — Charlotte M Baker
(74) *Attorney, Agent, or Firm* — MARSHALL, GERSTEIN & BORUN LLP

(57) ABSTRACT

Methods and systems for analyzing an integrity of a roof covering are presented. An exemplary method includes observing, by an imaging unit, a respective lift for one or more discontinuous roof covering materials of a roof covering of a structure. The exemplary method further includes generating, by one or more processors, an overall roof integrity rating based on the respective lift of one or more of the one or more discontinuous roof covering materials.

20 Claims, 5 Drawing Sheets

(56) References Cited

U.S. PATENT DOCUMENTS

| | | |
|---|---|---|
| 11,222,426 B2 | 1/2022 | Richter et al. |
| 11,232,150 B2 | 1/2022 | Vianello et al. |
| 11,367,265 B2 | 6/2022 | Vianello et al. |
| 2016/0314546 A1 * | 10/2016 | Malnati ................. H04W 4/021 |

* cited by examiner

SYSTEM AND METHOD FOR ANALYZING AN INTEGRITY OF A ROOF COVERING

CROSS-REFERENCE TO RELATED APPLICATION

This application is a continuation of U.S. patent application Ser. No. 17/699,723, entitled "System and Method for Analyzing an Integrity of a Roof Covering," filed on Mar. 21 2022, which is a continuation of U.S. patent application Ser. No. 16/996,890, entitled "System and Method for Analyzing an Integrity of a Roof Covering," filed on Aug. 18, 2020, which is a continuation of U.S. patent application Ser. No. 16/278,897, entitled "System and Method for Analyzing an Integrity of a Roof Covering," filed on Feb. 19, 2019, the disclosures of which are hereby incorporated herein by reference.

TECHNICAL FIELD

This application relates generally to determining an integrity of a roof covering and, more particularly, to a system and method using directed airflow to analyze the integrity of a roof covering including discontinuous roof covering materials, such as shingles.

BACKGROUND

During storms, gusts of wind can blow loose shingles off a roof. However, because roof shingles are arranged to overlap, identifying loose shingles in the absence of a powerful wind can be difficult because secure shingles overlapping loose shingles can lay flat on the course of roofing below and not be readily apparent to be loose by visual inspection alone.

Moreover, identifying loose shingles through the process of tugging individual shingles is tedious, inefficient, and potentially harmful to the shingles themselves. For example, tugging an individual shingle may crack or break the shingle, damage the seal connecting the shingle to the roof deck or waterproofing layer, or produce similar effects to surrounding shingles due to their overlapping pattern.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer implemented method for analyzing an integrity of a roof covering is provided. The method may include identifying one or more roof sections of a structure; directing an airflow over one or more discontinuous roof covering materials of the roof section; observing a respective lift for each of the one or more discontinuous roof covering materials; determining a discontinuous roof covering material adhesion score for each of the one or more discontinuous roof covering materials based on the respective lift; generating an overall roof integrity rating based on one or more discontinuous roof covering material adhesion scores; and/or providing the overall roof integrity rating to a user of a computing device.

In another embodiment, computer device for analyzing an integrity of a roof covering is provided. The computer device may include an imaging unit configured to observe a respective lift for each of one or more discontinuous roof covering materials of one or more roof sections of a structure while an airflow is directed over the one or more discontinuous roof covering materials. The computer device may further include one or more processors and one or more memories coupled to the one or more processors. The one or more memories may include non-transitory computer executable instructions stored therein that, when executed by the one or more processors, cause the computer device to identify the one or more roof sections; obtain the respective lift for each of the one or more discontinuous roof covering materials from the imaging unit; determine a discontinuous roof covering material adhesion score for each of the one or more discontinuous roof covering materials based on the respective lift; generate an overall roof integrity rating based on one or more discontinuous roof covering material adhesion scores; and/or provide an overall roof integrity rating to a user of a computing device.

In yet another embodiment, a device for analyzing an integrity of a roof covering is provided. The device may include an airflow unit configured to generate an airflow over one or more discontinuous roof covering materials of one or more roof sections of a structure. The device may further include an imaging unit configured to observe the respective lift for each of the one or more discontinuous roof covering materials while the airflow is directed over the one or more discontinuous roof covering materials. The device may further include one or more processors and one or more memories coupled to the one or more processors. The one or more memories may include non-transitory computer executable instructions stored therein that, when executed by the one or more processors, cause the device to control the airflow from the airflow unit; obtain the respective lift for each of the one or more discontinuous roof covering materials from the imaging unit; and/or determine a discontinuous roof covering material adhesion score for each of the one or more discontinuous roof covering materials based on the respective lift.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

I. Example System and Related Functionality

Figure 1A:
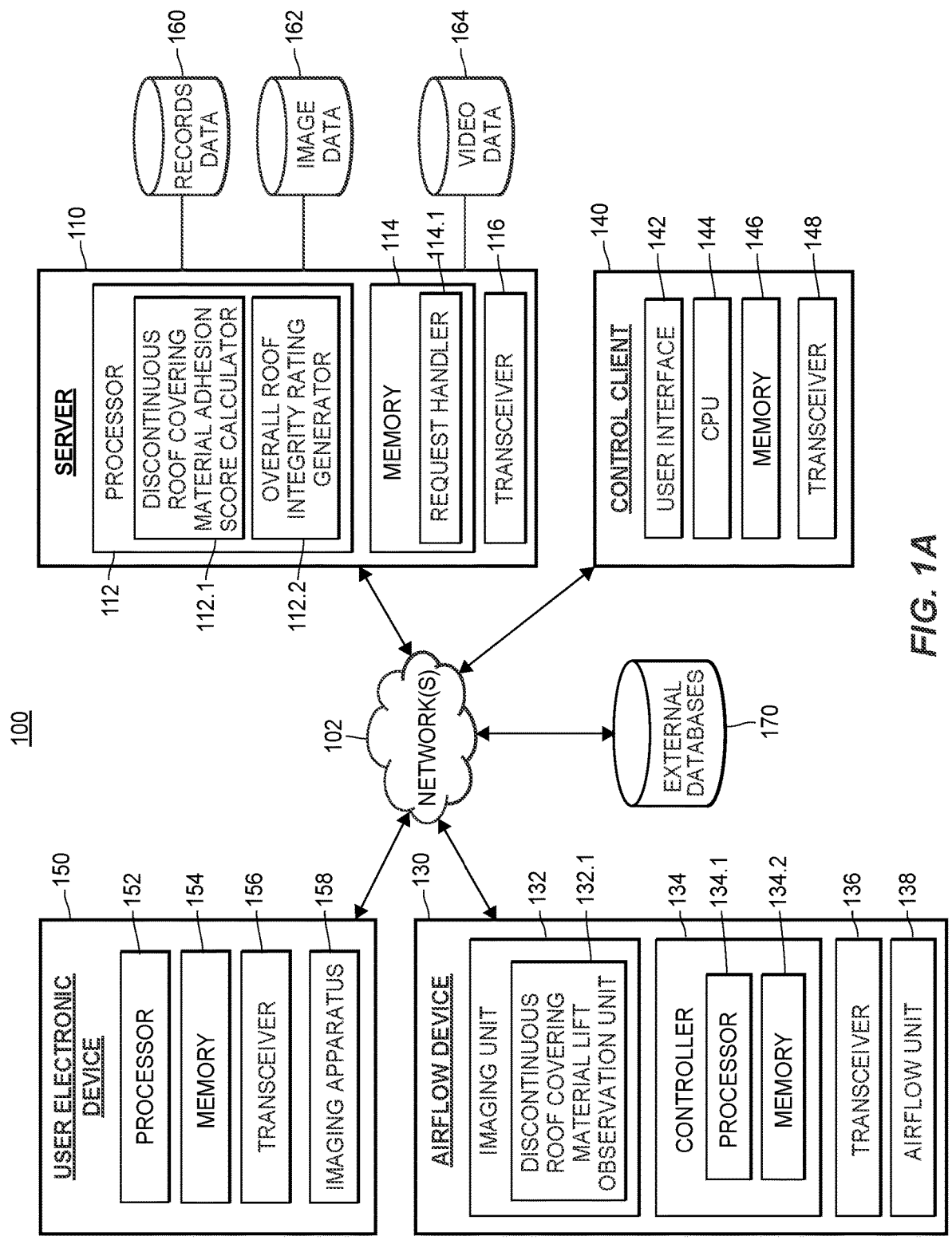
FIG. 1A illustrates an example system for analyzing an integrity of a roof covering.

FIG. 1A illustrates an example system 100 for analyzing an integrity of a roof covering. The example system 100 may include a network 102. The network 102 may be a computer network of an insurance provider (e.g., provided or used by the insurance provider or communications over which the insurance provider otherwise controls or facilitates).

The system may further include a server 110. The server 110 may include a processor 112, which may be configured to implement various processing logic modules, such as a discontinuous roof covering material adhesion score calculator 112.1 and an overall roof integrity rating generator 112.2. The server 110 may further include a memory 114, which includes a request handler 114.1, and a transceiver 116. The server may be communicatively coupled to other servers or databases, such as the records database 160, the image database 162, and the video database 164 as shown in FIG. 1.

In embodiments where, as further discussed below, the overall roof integrity rating is provided to an insurance provider, the insurance provider may receive this indication at the server 110. The server 110, in some embodiments, may also make available for download (e.g., via the network 102) the application executed by the user electronic device 150 to implement functionality described herein. It will be appreciated that server 110 may be a server provided by or used by the insurance provider, or use of which the insurance provider otherwise controls or facilitates.

The system 100 may further include an airflow device 130. The airflow device 130 may contain an imaging unit 132, a controller 134, a transceiver 136, and an airflow unit 138. In some embodiments, the imaging unit 132 may include a discontinuous roof covering material lift observation unit 132.1 for identifying the lift of discontinuous roof covering materials during testing. The controller 134 may include a processor 134.1 and a memory 134.2. The memory 134.2 may store computer-executable instructions, which may be executed by the processor 134.1. As shown in FIG. 1, the airflow device 130 may have a single imaging unit 132, or the airflow device 130 may include a number of imaging units. For example, the airflow device 130 may be configured to take images with both three dimensional and two dimensional imaging units. Additionally, the airflow device 130 may be configured to take images across a number of spectrum bandwidths (e.g., visible, IR, UV, etc.). The airflow unit 138 may include a ventilator, blower, fan, or any device suitable to generate an airflow 210, as referenced in FIG. 2B, sufficient to analyze the integrity of a roof covering.

Furthermore, in some embodiments, the airflow device 130 may be configured to capture an aerial image of a roof covering of interest. In this embodiment, the airflow device 130 may capture an aerial image large enough to perform the analysis described herein. The airflow device 130 may include any physical embodiment sufficient to capture such an aerial image (e.g., drone, imaging satellite, imaging plane).

The system may further include a control client 140 configured to control the airflow device 130, should a real-time inspection be requested or desired. For example, if the imaging requested or necessitated in an inspection to analyze the integrity of a roof covering includes utilizing a drone to capture aerial images of the roof covering of interest, a user may control the airflow device 130 (i.e., the drone) via the control client 140 to capture the necessary images. The control client 140 also includes a user interface 142, a CPU 144, a memory 146, and a transceiver 148. The memory 146 may store computer-executable instructions, which may be executed by the CPU 144. In some embodiments, the control client 140 and the airflow device 130 may be integrated into a single device.

The system may further include a user electronic device 150. The user electronic device 150 may include a processor 152, a memory 154, a transceiver 156, and an imaging apparatus 158. The memory 154 may store computer-executable instructions, which may be executed by the processor 152. In certain embodiments, the user electronic device 150 may be configured to receive communications from the server 110, the control client 140, or the airflow device 130 before, during, or after an analysis of the integrity of a roof covering has taken place. For example, the user electronic device 150 may be configured to receive live video footage from the airflow device 130 of the image capturing process.

In various embodiments, the user electronic device 150 may be configured to capture images of the roof covering of interest or the area surrounding the roof covering of interest. The use electronic device 150 may execute computer-executable instructions, such as a mobile application, that allow the actions described herein to be implemented. For example, if the user electronic device 150 is a smartphone, the user may capture images with the imaging apparatus 158 to transmit through the network 102 to the server 110, airflow device 130, or control client 140 for processing. The user electronic device 150, and each of the computing devices referred to herein, may be any suitable computing device such as, but not limited to, a desktop computer, a laptop computer, a mobile phone such as a smart phone, a tablet, a phablet, smart glasses, other wearable computing device, etc. Moreover, it should be appreciated that the system 100 may be configured to process real-time footage of a roof covering of interest and its surrounding area (e.g., video footage captured by the user electronic device 150 or airflow device 130, or live streaming footage from any suitable device), in addition to a still image.

In various embodiments, processors of the user electronic device 150 and other devices, such as the server 110, may execute instructions to transmit data to, receive data from, or otherwise communicate with devices of the example system 100 via the network 102 as further described below. The network 102 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 102 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example system 100 allows analyzing an integrity of a roof covering, and allows, among other advantages, determination of an overall roof integrity rating for the roof covering based on particular information obtained from testing one or more roof sections of the roof covering.

II. Example Embodiment of an Airflow Device

Figure 1B:
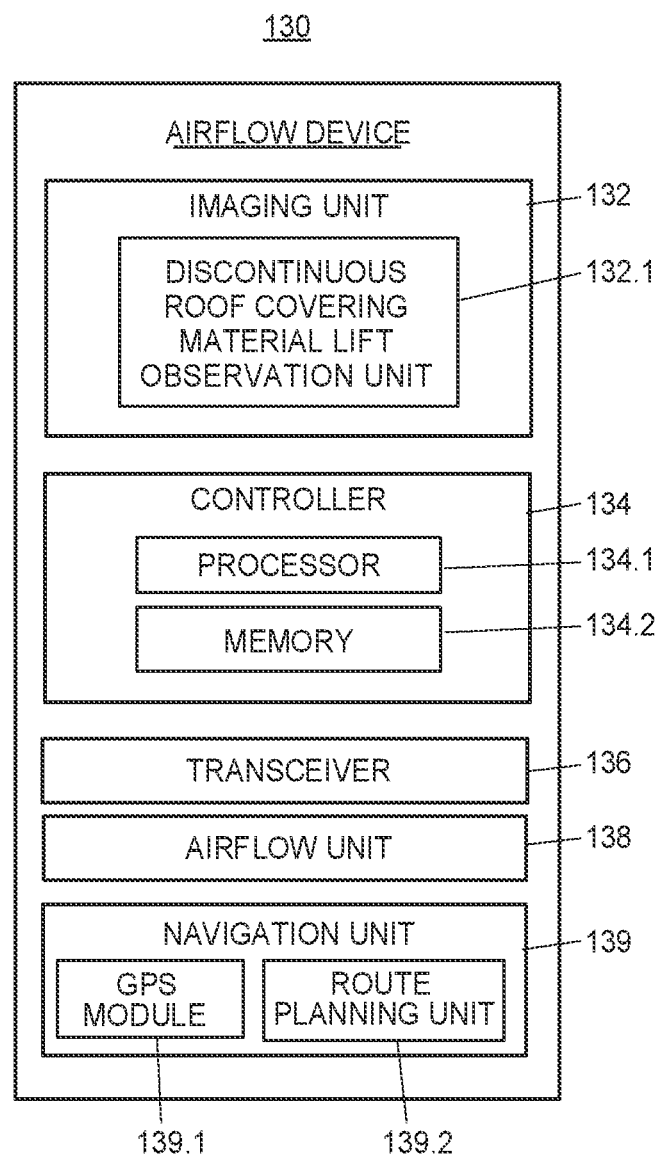
FIG. 1B illustrates an example embodiment of an airflow device for analyzing an integrity of a roof covering.

FIG. 1B illustrates an example embodiment of an airflow device 130 for analyzing an integrity of a roof covering, in which the airflow device 130 is an unmanned vehicle (e.g., a UAV or drone). The airflow device 130 may include the imaging unit 132, the controller 134, the transceiver 136, and the airflow unit 138, as discussed elsewhere herein. The airflow device 130 may further include a navigation unit 139. The navigation unit 139 may include a GPS module 139.1 and a route planning unit 139.2. In various embodiments, the airflow device 130 may be configured to capture images or video of a roof covering of interest through either aerial or ground-based methods (e.g., a drone or a rover). In either case, the airflow device 130 may use the navigation unit 139 to receive instructions, coordinates, or any other suitable information for analyzing the integrity of a roof covering from a server, database, or other suitable device (e.g., server 110, user electronic device 150, or control client 140) to determine a specific location associated with the roof covering of interest.

For example, if the airflow device 130 is a drone, the airflow device 130 may facilitate a remote analysis of the integrity of a roof covering of interest. In this example, the airflow device 130 may use the GPS module 139.1 to obtain current GPS coordinates or other information suitable to identify the specific location of the airflow device 130 relative to the roof covering of interest. Moreover, the airflow device 130 may use the route planning unit 139.2 to determine a route from the airflow device's 130 current location to the roof covering of interest. Finally in this example, the airflow device 130 may follow the route determined by the route planning unit 139.2 to the specific location, as determined from the information received by the GPS module 139.1, to conduct a remote analysis of an integrity of the roof covering of interest.

III. Example Perspective View of a Number of Roof Sections of a Structure

Figure 2A:
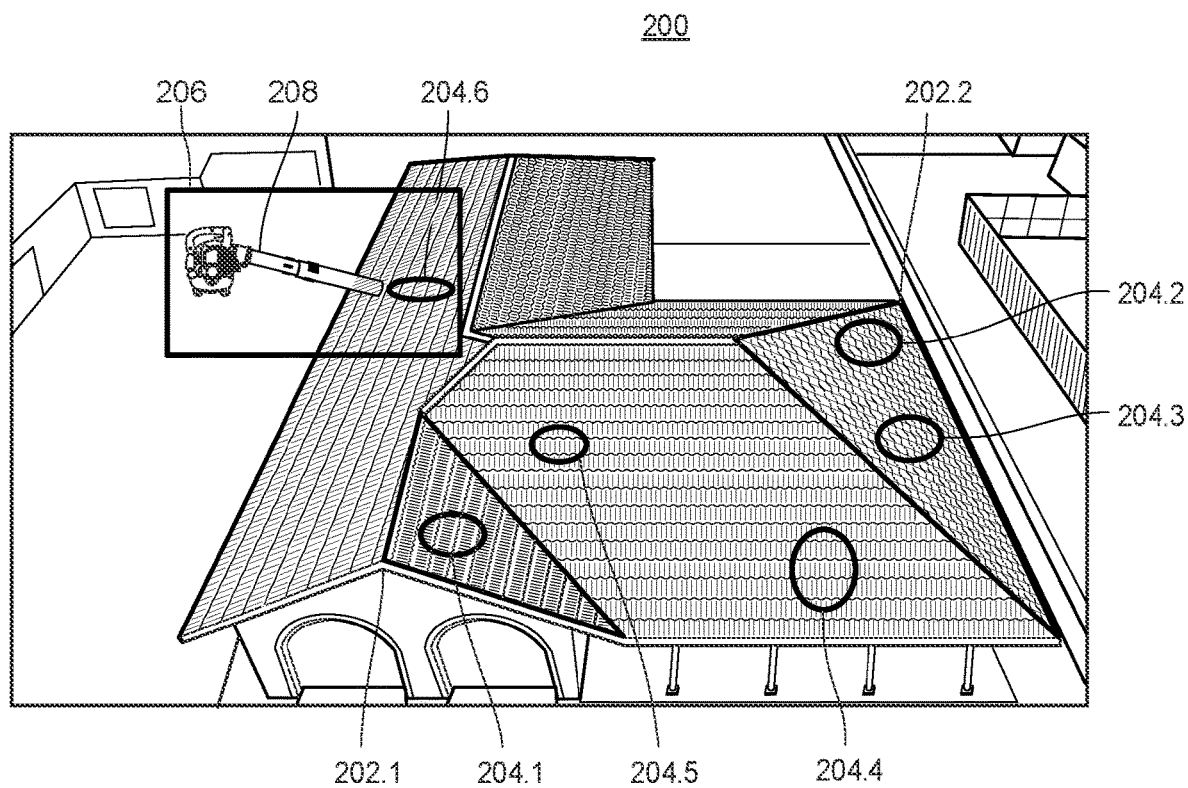
FIG. 2A illustrates a perspective view of a roof of interest in accordance with various embodiments disclosed herein.

FIG. 2A illustrates an example perspective view of a roof of interest 200 in accordance with various embodiments disclosed herein. The roof of interest 200 may include a number of roof surfaces, for example, roof surfaces 202.1 and 202.2. The roof of interest 200 may additionally include one or more roof sections, for example, roof sections 204.1-204.6. The roof of interest 200 may include a testing area 206. The testing area 206, as further illustrated in FIG. 2B, may include a roof section 204.6 to be tested using the airflow device 208. It should be understood that further reference herein to the airflow device 208 is intended to include the various embodiments discussed in reference to FIGS. 1A and 1B, as well as any other variations or combinations of features which would be suitable for analyzing the integrity of a roof covering.

In various embodiments, the roof of interest 200 may include one roof surface or a plurality of roof surfaces that define distinct portions of the roof of interest 200 (e.g., roof surfaces 202.1 and 202.2). Moreover, it should be understood that the number of roof surfaces and one or more roof sections (e.g., 204.1-204.6) may be any number or size suitable for analyzing the integrity of a roof covering.

Figure 2B:
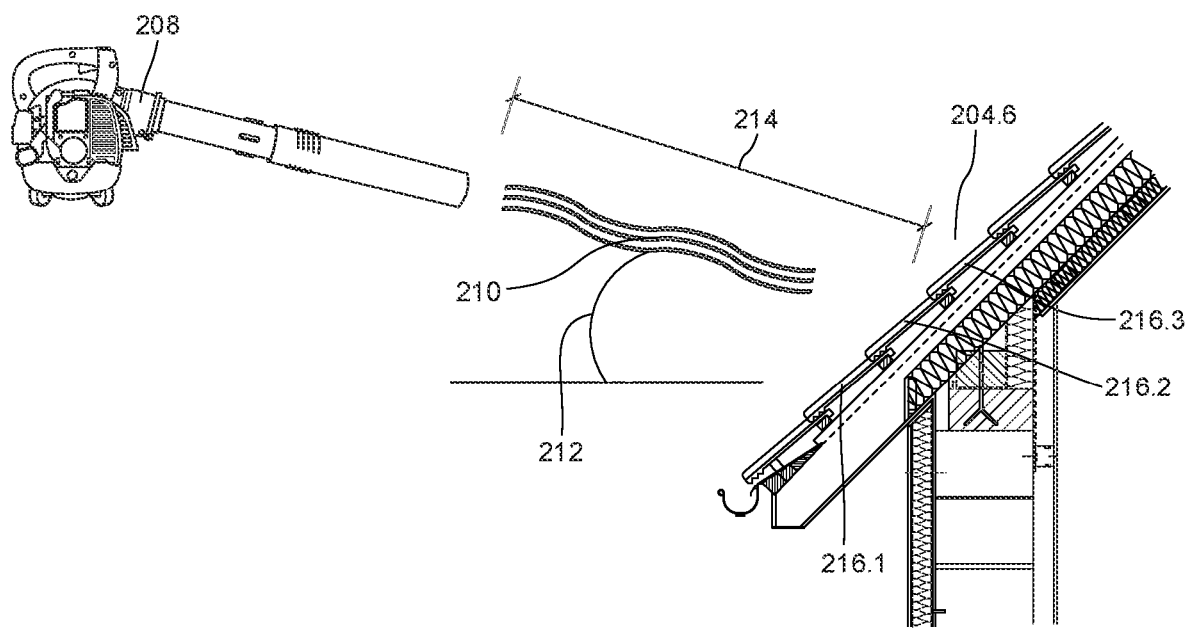
FIG. 2B illustrates a profile view of an example operational embodiment of a method for analyzing an integrity of a roof covering.

IV. Example Profile View of an Operational Embodiment of a Method for Analyzing an Integrity of a Roof Covering FIG. 2B illustrates a profile view of an example operational embodiment of a method for analyzing an integrity of a roof covering. The example operational embodiment may include a testing area, for example, testing area 206 as additionally illustrated in FIG. 2A. The testing area 206 may include the roof section 204.6. The airflow device 208 may be activated within the testing area 206 to generate and control an airflow 210 at an airflow angle 212 and an airflow distance 214 from the roof section 204.6 in order to determine the integrity of the roof section 204.6 based upon responses of discontinuous roof covering materials 216.1-216.3 to the airflow 210 during such testing. As further discussed herein in reference to FIG. 3, each of the airflow 210, the airflow angle 212, and the airflow distance 214 may be controlled, calculated, or determined by one or more processors (e.g., processor 134.1).

V. Example Method for Analyzing an Integrity of a Roof Covering

Figure 3:
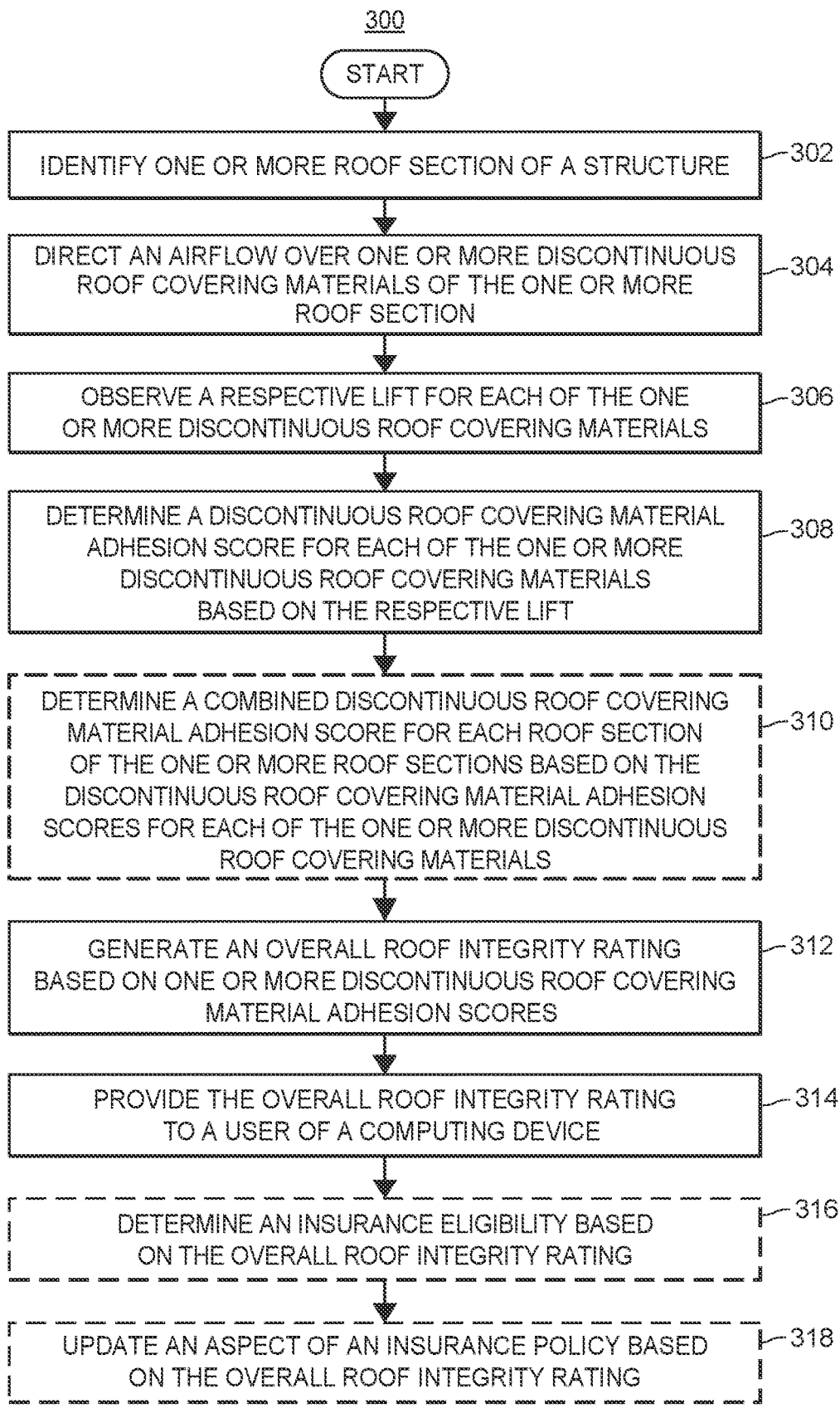
FIG. 3 illustrates a flow chart of an example method, routine, or process for analyzing an integrity of a roof covering.

FIG. 3 is a flow chart of an example method, routine, or process for analyzing an integrity of a roof covering. The method, routine, or process begins at block 302 by identifying one or more roof sections of a structure. For example, and in reference to FIG. 2A, the structure may be a structure including the roof of interest 200, and the one or more roof sections may be roof section 204.6. In this example, one or more processors (e.g., processor 112, processor 134.1, or processor 152) may analyze an image or other suitable visual representation of the roof of interest 200 to identify which area of the image or other suitable visual representation defines the one or more roof sections 204.6. The analysis techniques employed by the one or more processors may include any suitable technique or combination of techniques for analyzing an image (e.g., edge detection, color analysis, machine learning, pixel counting, thresholding, filtering, stitching, or any other suitable technique). In various embodiments, the non-transitory computer executable instructions stored on the one or more memories of a computer device or other device, for example, the airflow device 208, may cause the computer device or other device to identify the one or more roof sections 204.6.

In certain embodiments, the image or other suitable visual representation of the roof of interest 200 may be captured or otherwise acquired by an imaging component of any suitable device, including, for example, the airflow device 208 through the imaging unit 132 or the user electronic device 150 through the imaging apparatus 158. Additionally, images or other suitable visual representations of the roof of interest 200 may be retrieved from any suitable storage location, such as a database or server (e.g., the records database 160, the image database 162, the video database 164, or the external databases 170). For example, if a comparison to past conditions of the roof covering is desired before, during, or after an inspection to analyze the integrity of a roof covering, such images or other suitable visual representations may be retrieved to make such a comparison with the observed conditions of the current inspection.

At block 304, and in reference to FIG. 2B, the airflow device 208 may direct an airflow 210 over one or more discontinuous roof covering materials 216.1-216.3 of the one or more roof sections 204.6. In various embodiments, a device, for example, the airflow device 208, may be configured to generate an airflow 210 over the one or more discontinuous roof covering materials 216.1-216.3 of the one or more roof sections 204.6 of the roof of interest 200 of the structure. For example, the airflow device 208 may use the airflow unit 138 to generate an airflow 210 over the discontinuous roof covering materials 216.1-216.3. In various embodiments, the non-transitory computer executable instructions stored on the one or more memories of a computer device or other device, for example, the airflow device 208, may cause the computer device or other device to control the airflow 210 from the airflow unit 138.

In various embodiments, directing the airflow 210 over the one or more discontinuous roof covering materials 216.1-216.3 may further include determining, by the one or more processors, an angle (e.g., airflow angle 212) relative to the one or more discontinuous roof covering materials 216.1-216.3 to direct the airflow 210 over the one or more discontinuous roof covering materials 216.1-216.3. Some such embodiments directing the airflow 210 over the one or more discontinuous roof covering materials 216.1-216.3 may additionally include determining a distance (e.g., airflow distance 214) from the one or more discontinuous roof covering materials 216.1-216.3 to direct the airflow 210 over the one or more discontinuous roof covering materials 216.1-216.3. In various other embodiments, the non-transitory computer executable instructions stored on the one or more memories of a computer device or other device, for example, the airflow device 208, may cause the computer device or other device to make these determinations.

In further embodiments, the one or more discontinuous roof covering materials 216.1-216.3 may include any type of discontinuous roof covering material, panel, sheet, or any other suitable discontinuous roof covering material. For example, the one or more discontinuous roof covering materials 216.1-216.3 may include asphalt shingles, metal panels, metal shingles, stone-coated steel panels, slate panels, rubber slate panels, clay tiles, concrete tiles, or cedar shakes. In some embodiments, a computer device or other device, for example, the airflow device 208, may be configured to test any type of shingle, panel, sheet, or any other suitable discontinuous roof covering material, as included in the one or more discontinuous roof covering materials 216.1-216.3.

As an example, the airflow device 208 may capture and analyze an image in accordance with the various embodiments described in reference to block 302. In this example, at block 304, the one or more processors 134.1 of the airflow device 208 or other suitable device (e.g., processor 112 or processor 152) may direct the airflow 210 of the airflow device's 208 airflow unit 138 at a certain airflow angle 212 and airflow distance 214 to achieve a respective lift of the one or more discontinuous roof covering materials 216.1-216.3, as further described herein. To inform this direction by the one or more processors, computer-readable instructions executed by the one or more processors may include information such as the type of discontinuous roof covering material included in the one or more discontinuous roof covering materials 216.1-216.3 and defined wind speeds selected for the geographic region corresponding to the roof of interest 200. As mentioned herein, this and other relevant information may be obtained from the captured image or other suitable visual representation of the roof of interest 200 from block 302 or any source including any suitable database or server (e.g., the records database 160, the image database 162, the video database 164, or the external databases 170).

At block 306, the imaging unit 132 may observe a respective lift for each of the one or more discontinuous roof covering materials 216.1-216.3. In various embodiments, the imaging unit 132 may be configured to observe a respective lift for each of the one or more discontinuous roof covering materials 216.1-216.3 of the one or more roof sections 204.6 of the roof of interest 200 of the structure while the airflow 210 is directed over the one or more discontinuous roof covering materials 216.1-216.3. In various embodiments, the non-transitory computer executable instructions stored on the one or more memories of a computer device or other device, for example, the airflow device 208, may cause the computer device or other device to obtain the respective lift for each of the one or more discontinuous roof covering materials from the imaging unit 132. It should be understood that any suitable imaging device, for example, imaging unit 132 and the discontinuous roof covering material lift observation unit 132.1 or imaging apparatus 158 may be used to observe the respective lift for each of the one or more discontinuous roof covering materials 216.1-216.3.

For example, the airflow 210 directed over the one or more discontinuous roof covering materials 216.1-216.3 may cause the one or more discontinuous roof covering materials 216.1-216.3 to move in response. In other words, the airflow 210 may move under a surface of the one or more discontinuous roof covering materials 216.1-216.3 and force a portion of the one or more discontinuous roof covering materials 216.1-216.3 to move away from that portion's resting position on the roof of interest 200. This movement may then be observed by the imaging unit 132 while the airflow 210 is directed over the one or more discontinuous roof covering materials 216.1-216.3. In some embodiments, observing the lift for a discontinuous roof covering material 216 may include comparing a plurality of images of the discontinuous roof covering material 216 taken at different times associated with different levels of airflow 210, which may include times without airflow 210 generated by the airflow device 208. Changes in the relative position of an edge of the discontinuous roof covering material 216 may be identified between the images. Such changes in the edge of the discontinuous roof covering material 216 may be used to measure lift of the discontinuous roof covering material 216 as a distance of movement or an angle of movement of the edge of the discontinuous roof covering material 216, which may be calculated by a module of the imaging unit 132 or by one or more processors based upon images captured by the imaging unit 132.

At block 308, the one or more processors may determine a discontinuous roof covering material adhesion score for each of the one or more discontinuous roof covering materials 216.1-216.3 based on the respective lift. In other embodiments, the non-transitory computer executable instructions stored on the one or more memories of a computer device or other device, for example, the airflow device 208, may cause the computer device or other device to determine a discontinuous roof covering material adhesion score for each of the one or more discontinuous roof covering materials 216.1-216.3 based on the respective lift. For example, the one or more processors 112 of the server 110 may determine a discontinuous roof covering material adhesion score for each of the one or more discontinuous roof covering materials 216.1-216.3 using the discontinuous roof covering material adhesion score calculator 112.1.

In various embodiments, the discontinuous roof covering material adhesion score for each of the one or more discontinuous roof covering materials 216.1-216.3 indicates a seal quality for each of the one or more discontinuous roof covering materials 216.1-216.3 that is calculated from one or more measurements of lift of the discontinuous roof covering materials 216.1-216.3 associated with one or more levels of airflow 210. The seal quality may include a rating based on the integrity of the seal and may also include an expected longevity for the seal.

In various other embodiments, determining the discontinuous roof covering material adhesion score for each of the one or more discontinuous roof covering materials 216.1-216.3 may include assessing at least one of a curvature of a respective discontinuous roof covering material of the one or more discontinuous roof covering materials 216.1-216.3, a smoothness of the respective discontinuous roof covering material, or the seal quality of the respective discontinuous roof covering material. The non-transitory computer executable instructions that cause the computer device or other device to determine the discontinuous roof covering material adhesion score for each of the one or more discontinuous roof covering materials 216.1-216.3 may further cause the computer device or other device to make these additional assessments. For example, the curvature, smoothness, and seal quality of a respective discontinuous roof covering material of the one or more discontinuous roof covering materials 216.1-216.3 may be determined while the airflow 210 is directed over the one or more discontinuous roof covering materials 216.1-216.3, or at any point after the one or more processors has identified the one or more roof sections 204.6 of the roof of interest 200 of the structure.

In yet other embodiments, determining the discontinuous roof covering material adhesion score for each of the one or more discontinuous roof covering materials 216.1-216.3 may include generating a plurality of discontinuous roof covering material adhesion scores. The non-transitory computer executable instructions that cause the computer device or other device to determine the discontinuous roof covering material adhesion score for each of the one or more discontinuous roof covering materials 216.1-216.3 may further cause the computer device or other device to create the plurality of discontinuous roof covering material adhesion scores. In either embodiment, and as described in optional block 310, the one or more processors may then determine a combined discontinuous roof covering material adhesion score for each roof section of the one or more roof sections (e.g., roof section 204.6) based on the discontinuous roof covering material adhesion scores for each of the one or more discontinuous roof covering materials 216.1-216.3.

For example, after the airflow device 208 has determined a discontinuous roof covering material adhesion score for each of the one or more discontinuous roof covering materials 216.1-216.3 in the roof section 204.6, the one or more processors may combine the discontinuous roof covering material adhesion scores for each of the one or more discontinuous roof covering materials 216.1-216.3 to determine a combined discontinuous roof covering material adhesion score for the roof section 204.6. This combination may occur in any suitable fashion to analyze the integrity of a roof covering, and may include, for example, an additive combination of each discontinuous roof covering material adhesion score, a weighted additive combination of each discontinuous roof covering material adhesion score, an average of each discontinuous roof covering material adhesion score, a weighted average of each discontinuous roof covering material adhesion score, or any combination or permutation therein. Additionally, it should be understood that any number of the discontinuous roof covering material adhesion scores for each of the one or more discontinuous roof covering materials 216.1-216.3 may be included in the combined discontinuous roof covering material adhesion score.

At block 312, the one or more processors may generate an overall roof integrity rating based on one or more discontinuous roof covering material adhesion scores. In other embodiments, the non-transitory computer executable instructions stored on the one or more memories of a computer device or other device, for example, the airflow device 208, may cause the computer device or other device to generate an overall roof integrity rating based on one or more discontinuous roof covering material adhesion scores. For example, the one or more processors 112 of the server 110 may use the overall roof integrity rating generator 112.2 to generate an overall roof integrity rating.

In various embodiments, the overall roof integrity rating may be based on one or more discontinuous roof covering material adhesion scores, the combined discontinuous roof covering material adhesion score, as discussed herein in reference to optional block 310, or the plurality of discontinuous roof covering material adhesion scores, as discussed herein in reference to block 308.

At block 314, the one or more processors 134.1 may provide the overall roof integrity rating to a user of a computing device. In other embodiments, the non-transitory computer executable instructions stored on the one or more memories of a computer device or other device, for example, the airflow device 208, may cause the computer device or other device to provide the overall roof integrity rating to a user of a computing device. In various embodiments, the overall roof integrity rating may indicate an adhesion of the roof covering to itself, an adhesion of the roof covering to a roof deck, or any combination of additional indications of the integrity of the roof covering. Providing the overall roof integrity rating to the user may include presenting the overall roof integrity rating to the user via a display of the computing device, such as the user interface 142 of the control client 140.

At optional block 316, in embodiments where the overall roof integrity rating is provided to a prospective insurance provider, the one or more processors 134.1 may determine an insurance eligibility based on the overall roof integrity rating. For example, an insurer may determine that the risk associated with the current roof integrity is too high to issue a new policy or to renew an existing policy based upon the overall roof integrity rating. An insurer may similarly limit the types or amounts of coverage offered for the structure. In some embodiments, the non-transitory computer executable instructions stored on the one or more memories of a computer device or other device, for example, the airflow device 208, may cause the computer device or other device to determine an insurance eligibility based on the overall roof integrity rating.

For example, the prospective insurance provider may use the overall roof integrity rating to determine an insurance eligibility by comparing the overall roof integrity rating to the insurance provider's underwriting criteria for a given area. If the prospective insurance provider determines that the overall roof integrity rating satisfies the underwriting criteria for the given area, the prospective insurance provider may conclude the structure (e.g., the structure including the roof of interest 200) is eligible for insurance coverage. Thus, the prospective insurance provider may choose to grant an owner of the structure or other interested party an insurance policy related to the structure.

Alternatively, if the prospective insurance provider determines the overall roof integrity rating does not satisfy the underwriting criteria for the given area, the prospective insurance provider may conclude the structure is ineligible for insurance coverage. Thus, the prospective insurance provider may choose to deny an owner of the structure or other interested party an insurance policy related to the structure. In some embodiments, the insurance provider may determine one or more changes or adjustments to the roof (e.g., the roof of interest 200) that may be made to improve the overall roof integrity rating, such as replacing or inspecting damaged or loose roof covering materials.

At optional block 318, the one or more processors 134.1 may update an aspect of an insurance policy based on the overall roof integrity rating. Updating the insurance policy may include determining a cost, premium, deductible, discount, or coverage level associated with insurance coverage for the structure including the roof of interest 200. For example, a high overall roof integrity rating may be used to reduce the premium for an insurance policy covering a house with a newly installed roof. In some embodiments, the non-transitory computer executable instructions stored on the one or more memories of a computer device or other device, for example, the airflow device 208, may cause the computer device or other device to update an aspect of an insurance policy based on the overall roof integrity rating.

For example, the insurance policy may be updated to include an adjustment to one or more aspects of the insurance policy (e.g., premium, deductible, or coverage). The insurance policy may be associated with the structure (e.g., the structure including the roof of interest 200) due to analysis such as that performed at optional block 316, or the insurance policy may be a pre-existing policy associated with the structure before any steps of the method 300 were performed. Updating the insurance premium may be performed based on a score or other metric where the overall roof integrity rating is provided as a score or other quality metric. In some embodiments, updating an insurance policy may include generating an indication of the update to the insurance policy and causing such indication to be presented to a policyholder via a computer interface. In further embodiments, an update to the insurance policy may be implemented by a server (e.g., server 110), which may include generating policy documents and obtaining payment.

VI. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the user electronic device 150, the airflow device 130, the control client 140, the server 110, and/or any other computing devices within the example system 100 in any suitable combination). The routines may be included as part of any of the modules described in relation to FIG. 1A or as part of a module that is external to the system illustrated by FIG. 1A. For example, the methods or portions thereof may be part of a browser application(s) or an application(s) running on any of the devices in the example system 100 as a plug-in or other module of the browser application. Further, the methods may be employed as "software-as-a-service" to provide, for example, the user electronic device 150, the airflow device 130, the control client 140, the server 110, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for determining a quality of driving of a vehicle. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer implemented method for analyzing an integrity of a roof covering, the method comprising:
   observing, by an imaging unit, a respective lift for one or more discontinuous roof covering materials of a roof covering of a structure; and
   generating, by one or more processors, an overall roof integrity rating based on the respective lift of one or more of the one or more discontinuous roof covering materials.

2. The computer implemented method of claim 1, wherein the one or more discontinuous roof covering materials include: (i) asphalt shingles, (ii) metal panels, (iii) metal shingles, (iv) stone-coated steel panels, (v) slate panels, (vi) rubber slate panels, (vii) clay tiles, (viii) concrete tiles, or (ix) cedar shakes.

3. The computer implemented method of claim 1, further comprising:
   directing, by an airflow device, an airflow over the one or more discontinuous roof covering materials; and
   determining, by the one or more processors, at least one of: (i) an angle relative to the one or more discontinuous roof covering materials to direct the airflow over the one or more discontinuous roof covering materials or (ii) a distance from the one or more discontinuous roof covering materials to direct the airflow over the one or more discontinuous roof covering materials.

4. The computer implemented method of claim 1, further comprising:
   determining, by the one or more processors, a discontinuous roof covering material adhesion score for each of the one or more discontinuous roof covering materials based on the respective lift, wherein the discontinuous roof covering material adhesion score for each of the one or more discontinuous roof covering materials indicates a seal quality for each of the one or more discontinuous roof covering materials.

5. The computer implemented method of claim 4, wherein determining the discontinuous roof covering material adhesion score for each of the one or more discontinuous roof covering materials includes assessing at least one of: (i) a curvature of a respective discontinuous roof covering material of the one or more discontinuous roof covering materials, (ii) a smoothness of the respective discontinuous roof covering material, or (iii) the seal quality of the respective discontinuous roof covering material.

6. The computer implemented method of claim 1, further comprising:
   creating, by the one or more processors, a plurality of discontinuous roof covering material adhesion scores based on the respective lift of one or more of the one or more discontinuous roof covering materials;
   updating, by the one or more processors, an aspect of an insurance policy based on the overall roof integrity rating; and
   determining, by the one or more processors, eligibility of the structure for coverage under the insurance policy based on the overall roof integrity rating, wherein the overall roof integrity rating is based on the plurality of discontinuous roof covering material adhesion scores.

7. The computer implemented method of claim 1, wherein the overall roof integrity rating indicates at least one of: (i) an adhesion of the roof covering to itself, or (ii) an adhesion of the roof covering to a roof deck.

8. The computer implemented method of claim 1, further comprising:
   identifying, by the one or more processors, one or more roof sections of the roof covering that include the one or more discontinuous roof covering materials; and
   providing, by the one or more processors, the overall roof integrity rating to a user of a computing device.

9. A computer device for analyzing an integrity of a roof covering, the computer device comprising:
   an imaging unit configured to observe a respective lift for each of one or more discontinuous roof covering materials of a roof covering of a structure;
   one or more processors; and
   one or more memories coupled to the one or more processors, the one or more memories including non-transitory computer executable instructions stored therein that, when executed by the one or more processors, cause the computer device to:
      obtain the respective lift for each of the one or more discontinuous roof covering materials from the imaging unit, and
      generate an overall roof integrity rating based on the respective lift of one or more of the one or more discontinuous roof covering materials.

10. The computer device of claim 9, wherein the computer device further comprises a display, and the non-transitory computer executable instructions, when executed by the one or more processors, further cause the computer device to:
   provide the overall roof integrity rating to a user via the display.

11. The computer device of claim 9, wherein the non-transitory computer executable instructions, when executed by the one or more processors, further cause the computer device to:
   determine at least one of the following: (i) an angle relative to the one or more discontinuous roof covering materials to direct an airflow over the one or more discontinuous roof covering materials, or (ii) a distance from the one or more discontinuous roof covering materials to direct the airflow over the one or more discontinuous roof covering materials.

12. The computer device of claim 9, wherein the non-transitory computer executable instructions, when executed by the one or more processors, further cause the computer device to:
   determine a discontinuous roof covering material adhesion score for each of the one or more discontinuous roof covering materials based on the respective lift, the discontinuous roof covering material adhesion score for each of the one or more discontinuous roof covering materials indicating a seal quality for each of the one or more discontinuous roof covering materials.

13. The computer device of claim 12, wherein the non-transitory computer executable instructions, when executed by the one or more processors, further cause the computer device to:
   assess at least one of: (i) a curvature of a respective discontinuous roof covering material of the one or more discontinuous roof covering materials, (ii) a smoothness of the respective discontinuous roof covering material, or (iii) the seal quality of the respective discontinuous roof covering material.

14. The computer device of claim 9, wherein the non-transitory computer executable instructions, when executed by the one or more processors, further cause the computer device to:
   create a plurality of discontinuous roof covering material adhesion scores based on the respective lift of one or more of the one or more discontinuous roof covering materials;
   update an aspect of an insurance policy based on the overall roof integrity rating; and
   determine eligibility of the structure for coverage under the insurance policy based on the overall roof integrity rating, wherein the overall roof integrity rating is based on the plurality of discontinuous roof covering material adhesion scores.

15. The computer device of claim 9, wherein the overall roof integrity rating indicates at least one of: (i) an adhesion of the roof covering to itself, or (ii) an adhesion of the roof covering to a roof deck.

16. A device for analyzing an integrity of a roof covering, the device comprising:

an imaging unit configured to observe a respective lift for each of one or more discontinuous roof covering materials of a roof covering of a structure;

one or more processors; and one or more memories coupled to the one or more processors, the one or more memories including non-transitory computer executable instructions stored therein that, when executed by the one or more processors, cause the device to:

obtain the respective lift for each of the one or more discontinuous roof covering materials from the imaging unit, and generate an overall roof integrity rating based on the respective lift of one or more of the one or more discontinuous roof covering materials.

17. The device of claim 16, wherein the device is configured to test one or more types of discontinuous roof covering materials, including: (i) asphalt shingles, (ii) metal panels, (iii) metal shingles, (iv) stone-coated steel panels, (v) slate panels, (vi) rubber slate panels, (vii) clay tiles, (viii) concrete tiles, or (ix) cedar shakes.

18. The device of claim 16, further comprising:

an airflow unit configured to generate an airflow over the one or more discontinuous roof covering materials; and wherein the non-transitory computer executable instructions, when executed by the one or more processors, further cause the device to:

determine at least one of the following: (i) an angle relative to the one or more discontinuous roof covering materials for the airflow unit to direct the airflow over the one or more discontinuous roof covering materials, or (ii) a distance from the one or more discontinuous roof covering materials for the airflow unit to direct the airflow over the one or more discontinuous roof covering materials.

19. The device of claim 16, wherein the non-transitory computer executable instructions, when executed, further cause the device to:

determine a discontinuous roof covering material adhesion score for each of the one or more discontinuous roof covering materials based on the respective lift, wherein the discontinuous roof covering material adhesion score for each of the one or more discontinuous roof covering materials indicates a seal quality for each of the one or more discontinuous roof covering materials; and assess at least one of: (i) a curvature of a respective discontinuous roof covering material of the one or more discontinuous roof covering materials, (ii) a smoothness of the respective discontinuous roof covering material, or (iii) the seal quality of the respective discontinuous roof covering material.

20. The device of claim 16, wherein the non-transitory computer executable instructions, when executed, further cause the device to:

create a plurality of discontinuous roof covering material adhesion scores based on the respective lift of a one or more of the one or more discontinuous roof covering materials;

provide the overall roof integrity rating to a user of a computing device;

determine an eligibility of the structure for coverage under an insurance policy based on the overall roof integrity rating; and update an aspect of the insurance policy based on the overall roof integrity rating, wherein the overall roof integrity rating is based on the plurality of discontinuous roof covering material adhesion scores.

* * * * *